(12) United States Patent
Lee et al.

(10) Patent No.: US 10,946,628 B2
(45) Date of Patent: Mar. 16, 2021

(54) RESIN MOLDED ARTICLE

(71) Applicants: HONDA MOTOR CO., LTD., Tokyo (JP); SUNARROW LTD, Tokyo (JP)

(72) Inventors: Seonghun Lee, Wako (JP); Yuichi Takahashi, Tokyo (JP); Tomoomi Kiyomiya, Tokyo (JP)

(73) Assignees: HONDA MOTOR CO., LTD., Tokyo (JP); SUNARROW LTD, Tokyo (JP)

( * ) Notice: Subject to any disclaimer, the term of this patent is extended or adjusted under 35 U.S.C. 154(b) by 0 days.

(21) Appl. No.: 16/357,474

(22) Filed: Mar. 19, 2019

(65) Prior Publication Data

US 2019/0283374 A1 Sep. 19, 2019

(30) Foreign Application Priority Data

Mar. 19, 2018 (JP) .............................. JP2018-051037

(51) Int. Cl.
*B32B 27/08* (2006.01)
*B32B 3/26* (2006.01)
*B32B 27/36* (2006.01)
*B32B 27/40* (2006.01)
*B29L 31/00* (2006.01)

(52) U.S. Cl.
CPC .............. *B32B 27/08* (2013.01); *B32B 3/263* (2013.01); *B32B 27/365* (2013.01); *B32B 27/40* (2013.01); *B29L 2031/722* (2013.01); *B32B 2255/10* (2013.01); *B32B 2255/20* (2013.01); *B32B 2255/28* (2013.01); *B32B 2307/412* (2013.01); *B32B 2307/414* (2013.01)

(58) Field of Classification Search
CPC ....... B32B 27/08; B32B 27/365; B32B 27/40; B32B 27/36; B32B 3/263; B32B 3/30; B32B 3/00; B32B 2307/414; B32B 2307/412; B32B 2307/406; B32B 2307/546; B32B 2255/10; B32B 2255/20; B32B 2255/28; B32B 2255/26; B32B 2255/06; B32B 2451/00; B29L 2031/722
See application file for complete search history.

(56) References Cited

U.S. PATENT DOCUMENTS

2015/0027614 A1* 1/2015 Mori ...................... B32B 27/30
156/60
2015/0226889 A1* 8/2015 Guillemot ............. B32B 17/064
428/141

FOREIGN PATENT DOCUMENTS

JP 2010099870 A * 5/2010
JP 2013-166248 8/2013
JP 2013166248 A * 8/2013 ............. B32B 3/263

OTHER PUBLICATIONS

Espacenet Translation of JP2013166248 (Year: 2020).*
Espacenet Translation of JP2010099870A (Year: 2020).*

* cited by examiner

*Primary Examiner* — Michael Zhang
(74) *Attorney, Agent, or Firm* — Amin, Turocy & Watson LLP

(57) ABSTRACT

A resin molded article has a resin base layer formed of an ultraviolet curable resin. The resin base layer is provided on one end side with a cover layer made of a polymer membrane. Further, the resin base layer is provided on the other end side with recessed portions dented toward the cover layer. A decorative layer is formed at least at recessed portions. The decorative layer is visually recognizable through the resin base layer and the cover layer.

3 Claims, 11 Drawing Sheets

RESIN MOLDED ARTICLE

CROSS-REFERENCE TO RELATED APPLICATION

This application is based upon and claims the benefit of priority from Japanese Patent Application No. 2018-051037 filed on Mar. 19, 2018, the contents of which are incorporated herein by reference.

BACKGROUND OF THE INVENTION

Field of the Invention

The present invention relates to a resin molded article having an inside decorative layer partially visible.

Description of the Related Art

Resin molded articles having inside decorative layers partially visible from outside have been widely used as, for example, a casing of a so-called smart key or the like. The decorative layer is visually recognized by the user as a decorative pattern such as letters (characters), symbols, figures or the like.

Japanese Laid-Open Patent Publication No. 2013-166248 proposes a technology for enabling a decorative layer of this kind to be visually recognized three-dimensionally. That is, in the technology described in Japanese Laid-Open Patent Publication No. 2013-166248, a vapor deposited film is formed on a slant surface of a first resin molded article, and a printed layer is further formed on the surface of the vapor deposited film to form the decorative layer. Then, a liquid curable resin and a second sheet are covered on the decorative layer, and the liquid curable resin is cured thereafter to obtain a resin molded article ("decorative panel" in Japanese Laid-Open Patent Publication No. 2013-166248).

SUMMARY OF THE INVENTION

Generally speaking, casings of smart keys or the like are roundish for improved appearance (design quality). In recent years, there is a demand that a resin molded article be affixed to an article having such a curved surface. However, the liquid curable resin is generally hard and thus is difficult to be curved along the shape of an article on which the resin is to be affixing.

A primary object of the present invention is to provide a resin molded article, a decorative layer of which has three-dimensional appearance.

Another object of the present invention is to provide a resin molded article flexible and affixable to a curved surface.

According to one embodiment of the present invention, there is provided a resin molded article comprising:

a resin base layer formed of an ultraviolet curable resin, a cover layer provided on one end side of the resin base layer and made of a polymer membrane, and a decorative layer formed at least at a recessed portion which is dented from another end side of the resin base layer toward the cover layer, wherein the decorative layer formed at the recessed portion is visually recognizable through the resin base layer and the cover layer.

That is, in the present invention, the decorative layer is formed at the recessed portion. Because the recessed portion is a space which is formed three-dimensionally by being dented, the decorative layer formed at the recessed portion can be visually recognized three-dimensionally. That is, the decorative layer formed at the recessed portion becomes an ornamental portion.

Further, the ultraviolet curable resin is relatively flexible. Thus, since the resin base layer is relatively flexible, the resin molded article is easily curved (flexed). Accordingly, it is possible to easily affix this resin molded article to an article having a roundish curved surface. Through a simple work like this, the article can be given an excellent quality in design.

The decorative layer may be configured to have a metal layer formed of metal and a shielding layer formed at other portions than the recessed portion and interposed between the metal layer and the resin base layer. The metal layer in the recessed portion glosses the ornamental portion. Further, the shielding layer prevents the metal layer in the portion other than the recessed portion from being visually recognized. That is, it becomes possible for the user to visually recognize the portion only which, of the metal layer, is formed in the recessed portion. Therefore, the ornamental portion emerges three-dimensionally with gloss. For the reasons mentioned above, the ornamental portion becomes excellent in appearance.

Particularly, a black-colored, shielding layer has a large contrast difference from the metal layer. Therefore, the quality in design of the ornamental portion is further improved.

It is desirable that the shielding layer is flexible in comparison with the resin base layer. In this case, when the resin base layer is curved, the shielding layer is easily curved to follow the resin base layer. Thus, the shielding layer becomes hard to peel off from the resin base layer. Further, affixing the resin molded article to the curved surface is advantageously easy.

The flexibility of the shielding layer relative to the resin base layer can be determined by using, for example, elongation percentage and Shore D hardness as indexes. In the case of using these indexes, the shielding layer is determined to be flexible in comparison with the resin base layer when the shielding layer is larger in elongation percentage than the resin base layer and is smaller in Shore D hardness than the resin base layer.

Incidentally, it is desirable that the metal layer be discontinuous. Here, being discontinuous means that ultrafine pores are formed on the surface and inside of the metal layer due to aggregated bubbles of opening pores, closed pores and the like. The metal layer of this type, when curved, causes atoms to separate easily from one another. For this reason, while curving the resin molded article becomes easy, cracks or the like become hard to be produced in the metal layer, the quality in appearance of the ornamental portion can be kept high.

According to the present invention, because the decorative layer is configured to be formed at the recessed portion provided on the resin base layer, it is possible to visually recognize the decorative layer three-dimensionally. Further, because the resin base layer formed of the ultraviolet curable resin is relatively flexible, it is possible to curve the resin molded article easily. Therefore, through a simple operation such as affixing the resin molded article to an article (for example, casing or the like of a smart key) having a roundish curved surface, it becomes possible to give an excellent design quality to the article.

The above and other objects, features, and advantages of the present invention will become more apparent from the following description when taken in conjunction with the accompanying drawings, in which a preferred embodiment of the present invention is shown by way of an illustrative example.

DESCRIPTION OF THE PREFERRED EMBODIMENTS

Hereinafter, with reference to the accompanying drawings, a resin molded article according to the present invention will be described in detail based on an embodiment which is preferable in connection with a printing apparatus and a printing method.

Figure 1:
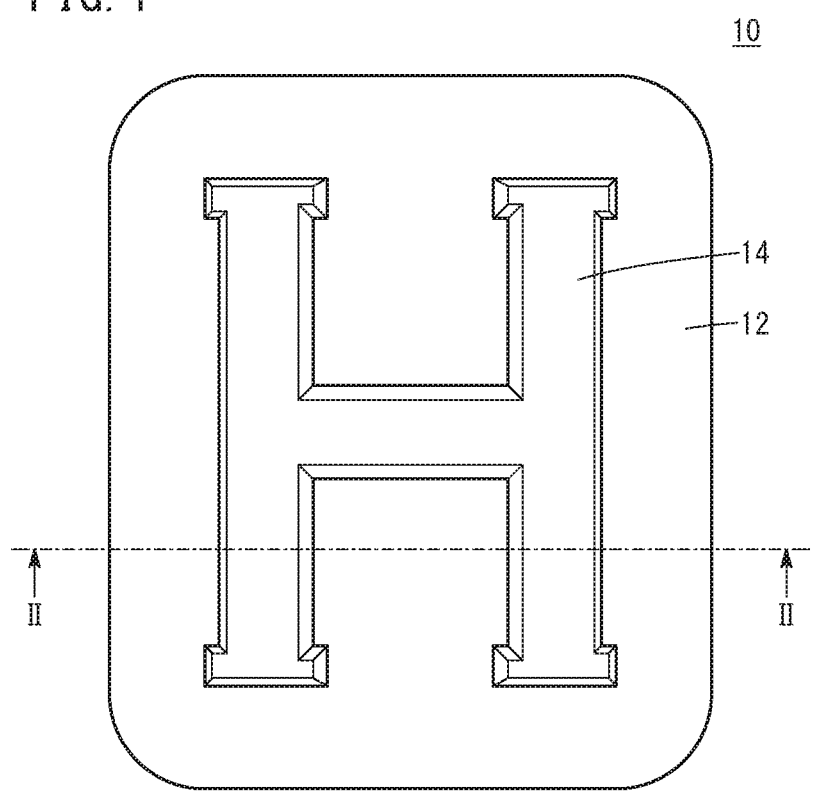
FIG. 1 is a plan view of a resin molded article according to an embodiment of the present invention.
Figure 2:
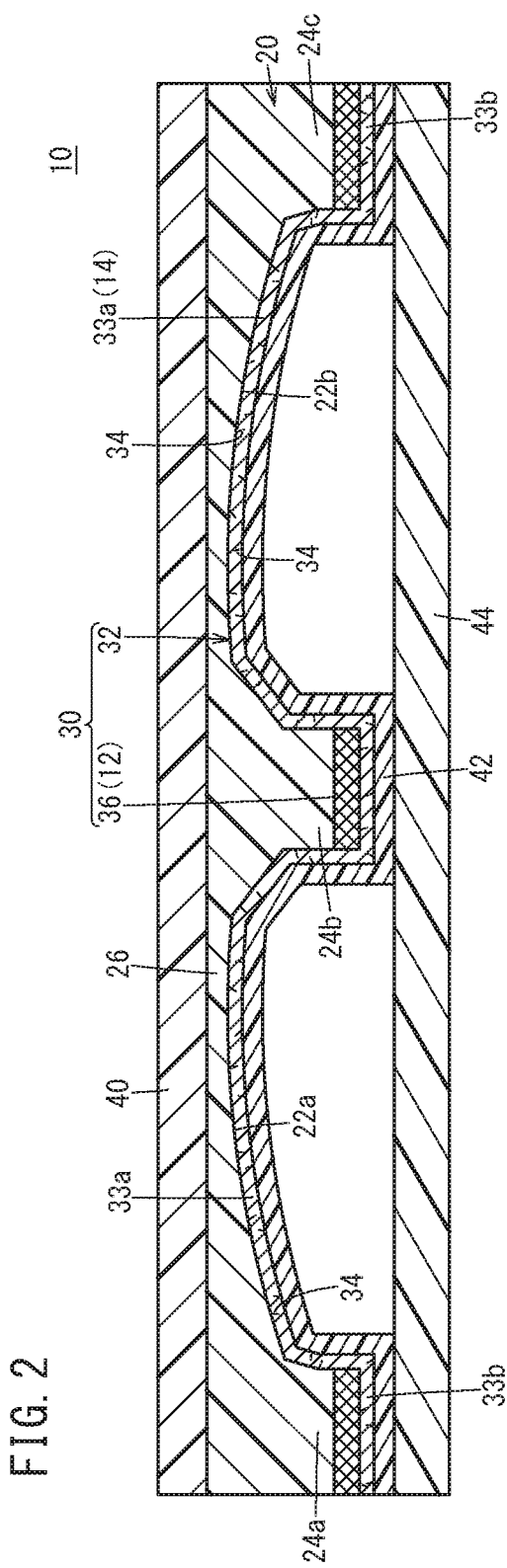
FIG. 2 is a sectional view of the resin molded article taken along the line II-II in FIG. 1.

FIG. 1 is a plan view of a resin molded article 10 according to the present embodiment, and FIG. 2 is a sectional view of the resin molded article taken along the line II-II in FIG. 1. This resin molded article 10 comprises a laminated film provided with an ornamental portion 14 on a plain portion 12. In this case, the ornamental portion 14 is formed by an ornamental character "H", and the ornamental character is visually recognizable as if to emerge three-dimensionally from the plain portion 12.

The resin molded article 10 has a resin base layer 20. Hereafter, a lower side and an upper side in FIG. 2 of the resin base layer 20 will be described respectively as a lower end and an upper end. In the lower end, two recessed portions 22a, 22b are formed in a groove shape extending from the front side toward the rear side of the drawing sheet of FIG. 2. These recessed portions 22a, 22b respectively correspond to two vertical leg portions of the ornamental character "H". Further, protruding portions 24a to 24c protrude relative to the recessed portions 22a, 22b on the lateral sides of the recessed portions 22a, 22b.

The recessed portions 22a, 22b are dented toward the upper end (toward a cover layer 40 referred to later). Further, the recessed portions 22a, 22b become deeper toward each other. That is, the recessed portions 22a, 22b are deepest at positions facing each other and are shallowest at positions being farthest from each other. Incidentally, a recessed portion (not shown) forming a horizontal bar portion of the ornamental character "H" is substantially as degree as the deepest portions of the recessed portions 22a, 22b.

A metal layer 32 of a decorative layer 30 is provided all over the lower end surface including the recessed portions 22a, 22b of the resin base layer 20. Of this metal layer 32, portions (hereafter referred to as "correspondingly recessed portions 33a") provided at the recessed portions 22a, 22b are visually recognized as ornamental portions 14. The metal layer 32 further improves its design quality with gloss.

The metal layer 32 are desirable to include ultrafine voids, that is, discontinuities 34 which are formed by aggregated bubbles of opening pores, closed pores and the like. This is because, as will be described later, the discontinuities (ultrafine voids) 34 make the resin molded article 10 easily curved and also make cracks or the like hard to be produced in the metal layer 32. The discontinuities 34 may be openings (opening pores) open to the surface of the metal layer 32 or may be closed interior spaces (closed pores).

Portions of the metal layer 32 except for the correspondingly recessed portions 33a (hereafter referred to as correspondingly flat portions 33b) are covered with a printed layer 36 as a shielding layer. In other words, the printed layer 36 is interposed between the correspondingly flat portions 33b of the metal layer 32 and the resin base layer 20. Thus, from the user using the resin molded article 10, the correspondingly flat portions 33b are hidden behind the printed layer 36 and thus, are invisible. This printed layer 36 and the metal layer 32 form the decorative layer 30.

It is preferable that the printed layer 36 be black in color. This is because, in this case, the difference in the contrast to the gloss of the metal layer 32 becomes large and improves the appearance of the ornamental portion 14.

The resin base layer 20 is formed of an ultraviolet curable resin. The ultraviolet curable resin is relatively flexible, and thus, the resin molded article 10 is easily curved when given an external force to bend the resin molded article 10. In this manner, the resin base layer 20 formed of the ultraviolet curable resin is a layer that gives flexibility to the resin molded article 10.

Here, the printed layer 36 is flexible in comparison to the resin base layer 20. More specifically, the printed layer 36 is larger in elongation percentage than the resin base layer 20 and is smaller in Shore D hardness than the resin base layer 20. This enables the decorative layer 30 to be flexed (curved) easily to follow the resin base layer 20. Accordingly, it is avoided that the decorative layer 30 peels off from the resin base layer 20 due to the difference in flexibility.

Incidentally, the elongation percentage is measured in accordance with a so-called B method which is specified by JIS K 7161 (conforming to ASTM D 638). The respective elongation percentages of the resin base layer 20 and the printed layer 36 are, for example, about 1 to 100% and 1 to 200%, respectively. Further, the respective Shore D hardness of the resin base layer 20 and the printed layer 36 are, for example, about 60° to 90° and 70° to 90°, respectively.

Further, examples of the material suitable as the metal layer 32 include indium, tin, alloys thereof or the like. In this case, it is easy to obtain the metal layer 32 having the discontinuities 34. Further, since these metals are radio wave transmissive, the interference in the communication from a smart key to a vehicle body can be avoided in the case where the resin molded article 10 is used as a casing of the smart key. On the other hand, examples of the material suitable as the printed layer 36 include urethane resins, vinyl chloride resins or the like.

The upper end of the resin base layer 20 is formed as a flat portion 26. The flat portion 26 is provided on the upper surface with a cover layer 40 formed of a polymer membrane 40a (refer to FIG. 5). Polyethylene terephthalate (PET) is quoted as a preferable example of a polymer forming the cover layer 40.

The resin base layer 20 and the cover layer 40 are each thin and transparent enough to transmit lights. Thus, when the user looks down on the resin molded article 10 from the outside of the cover layer 40, it is possible to visually recognize the ornamental portion 14 (the correspondingly recessed portions 33a of the metal layer 32) easily.

In the aforementioned configuration, the metal layer 32 is provided on its lower surface with a support layer 42 for preventing the decorative layer 30 from falling off the resin base layer 20. The support layer 42 is formed of, for example, urethane resins, vinyl chloride resins or the like and is formed in a shape to follow the shape of the metal layer 32.

Further, there is provided an adhesive tape 44 for enabling the resin molded article 10 to be affixed to an article. The adhesive tape 44 is spanned between flat portions of the support layer 42.

Next, advantageous effects of this resin molded article 10 will be described.

Figure 3:
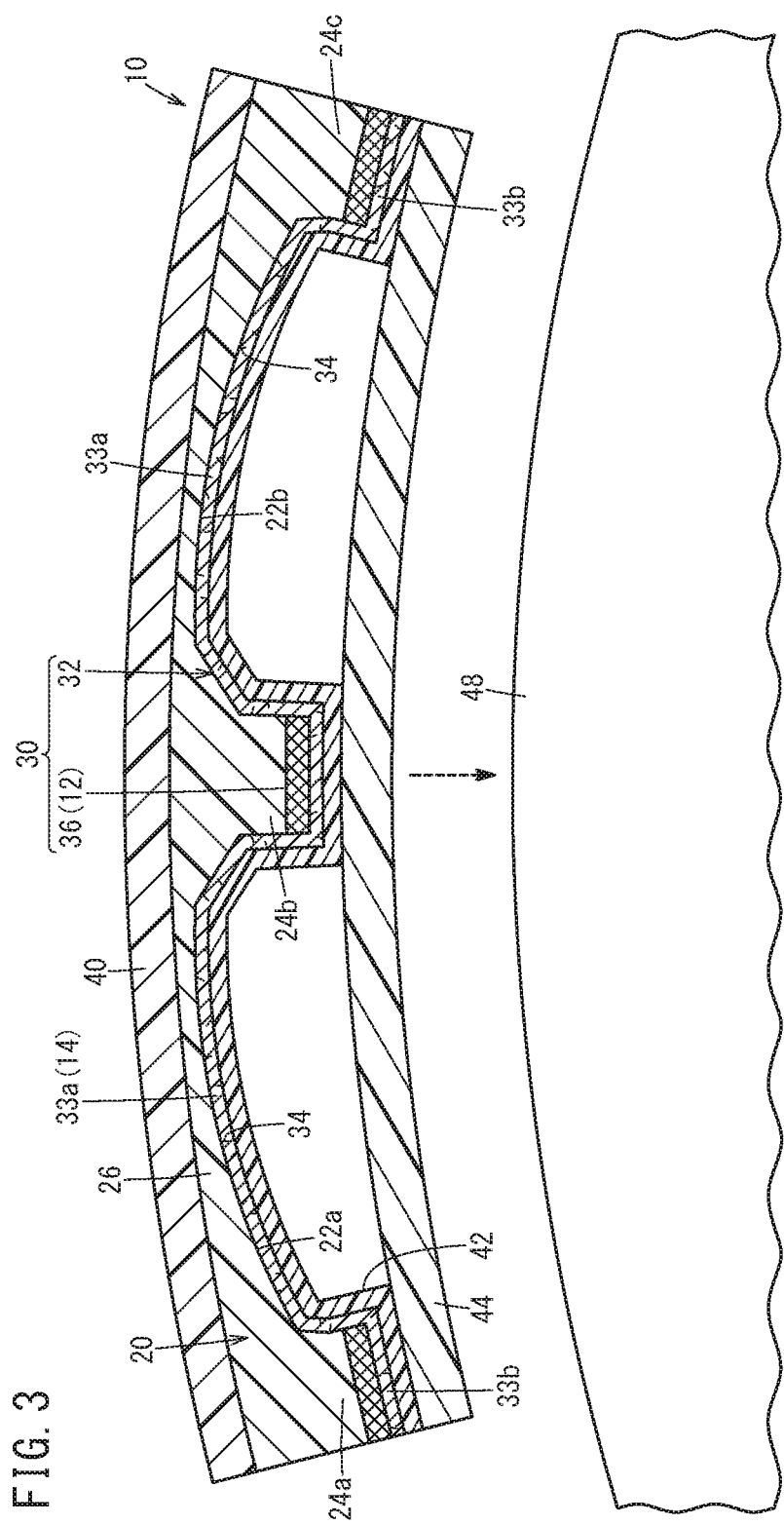
FIG. 3 is a schematic longitudinal sectional view showing a state that the resin molded article shown in FIG. 1 is curved and affixed to an article.

As shown in FIG. 3, the resin molded article 10 is affixed to an article 48 such as a casing of a smart key or the like, by means of the adhesive tape 44. In the case where the article 48 has a curved surface, the resin molded article 10 is curved to follow the curved surface of the article 48. As mentioned before, the resin base layer 20 is formed of the ultraviolet curable resin which is relatively flexible. Further, the printed layer 36 of the decorative layer 30 is flexible in comparison with the resin base layer 20. Therefore, the printed layer 36 is easily flexed (curved) to follow the resin base layer 20. In addition, the metal layer 32 is small in rigidity in the case of including the discontinuities 34 and is thus easy to be curved. For the reasons mentioned above, the decorative layer 30 becomes hard to be peeled off from the resin base layer 20, and the resin molded article 10 is curved easily.

In addition, when the metal layer 32 is curved, the discontinuities 34 allow the atoms to easily separate form one another. Thus, cracks or the like become hard to be produced in the metal layer 32. Accordingly, it is possible to keep the quality in appearance of the ornamental portion 14.

Accordingly, it is possible to easily affix the resin molded article 10 to a roundish article 48 and make the ornamental portion 14 aesthetic after affixing.

In addition, what the user can visually recognize is only the correspondingly recessed portions 33a of the metal layer 32. Because the recessed portions 22a, 22b are three-dimensionally shaped, the user recognizes the ornamental portion 14 as three-dimensional. In this manner, according to the present embodiment, it is easy to provide a three-dimensional appearance to the ornamental portion 14 sufficiently.

Next, the manufacturing method of the resin molded article 10 will be described.

Figure 4:
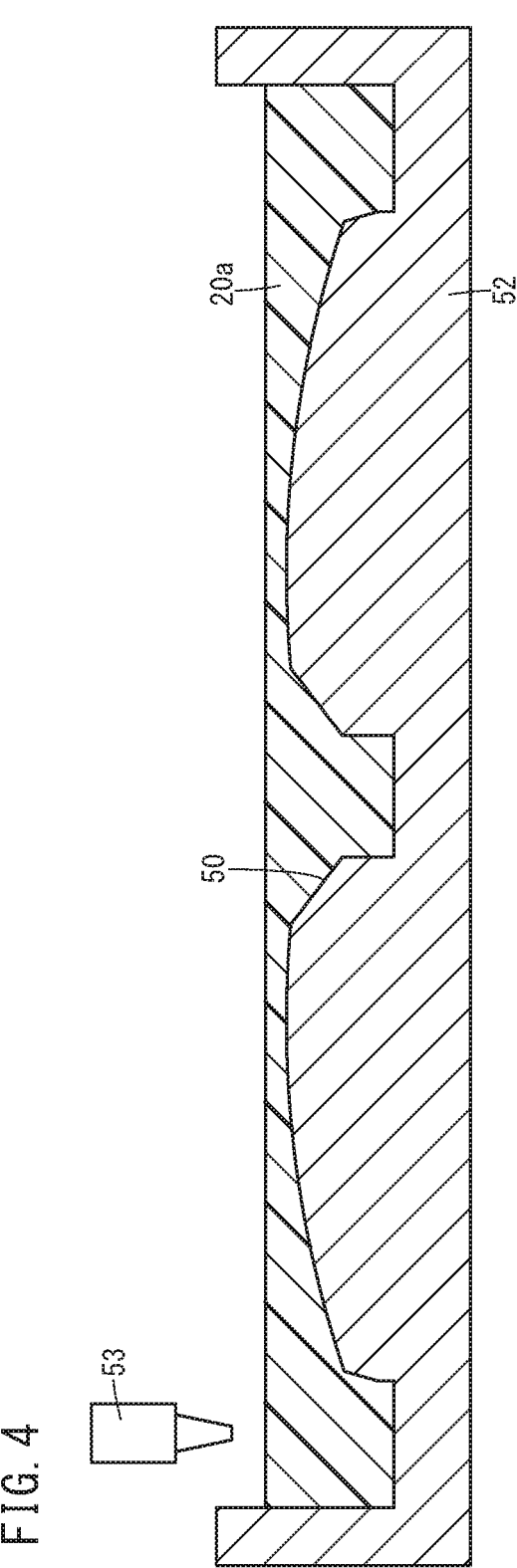
FIG. 4 is a schematic longitudinal sectional view showing a state that a cavity of a metal mold is filled with an ultraviolet curable resin.

First of all, as shown in FIG. 4, an ultraviolet curable resin 20a is injected into a metal mold 52 which is formed with a cavity 50 of the shape forming the ornamental character "H". The injection is performed by using a dispenser 53, and those portions overflowing from the cavity 50 merge to be connected.

Figure 5:
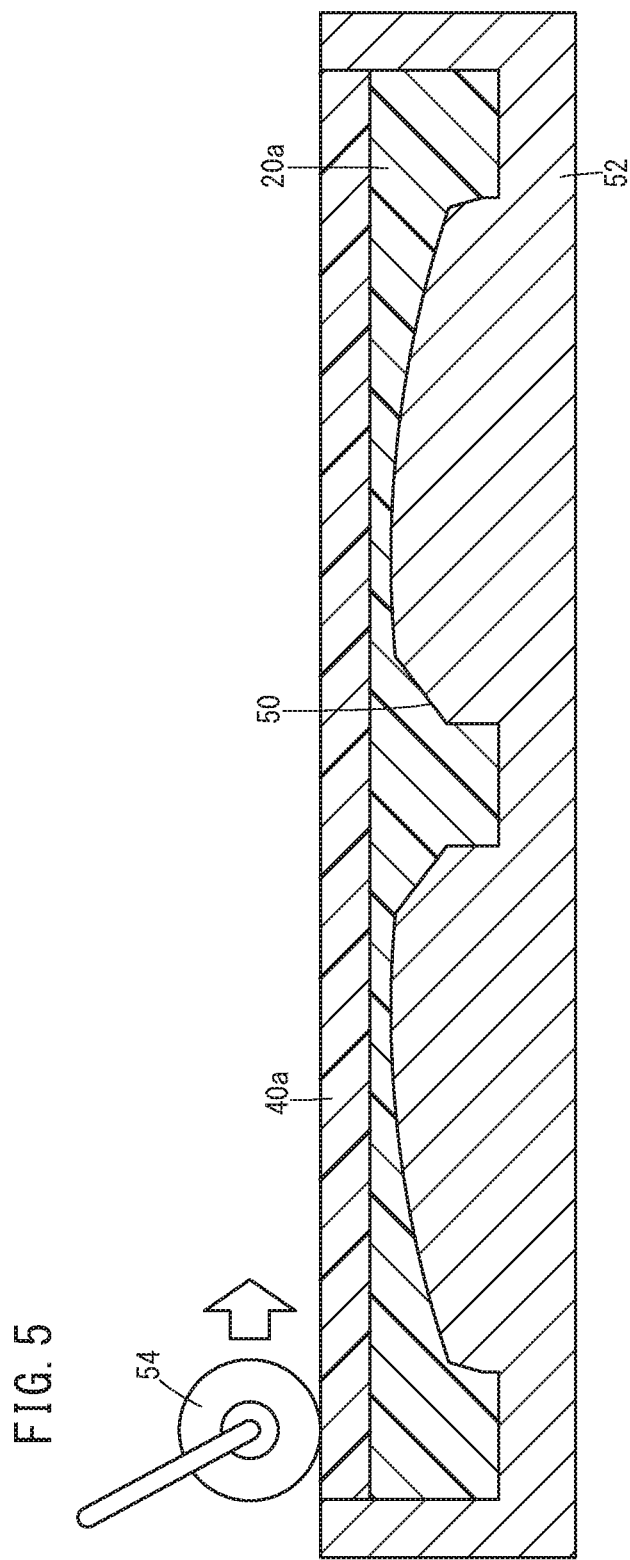
FIG. 5 is a schematic longitudinal sectional view showing a state that a polymer membrane is mounted on the ultraviolet curable resin and that pressuring is performed by a roller being an equalizer member.

Next, as shown in FIG. 5, the polymer membrane 40a is mounted on the ultraviolet curable resin 20a, and pressed by a roller 54 (flattener). In this state, the roller 54 is advanced toward the arrowed direction, whereby the ultraviolet curable resin 20a is leveled out to be adjusted in thickness. Although moving the roller 54 once in one way is sufficient, the roller 54 may be moved once in two ways, if necessary.

Figure 6:
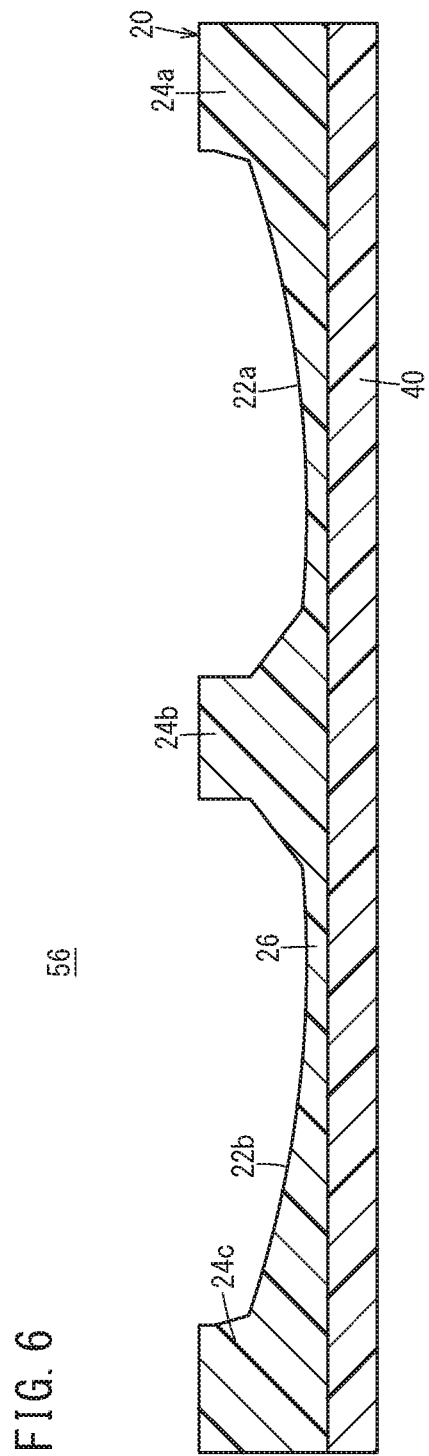
FIG. 6 is a schematic longitudinal sectional view of a composite body having a resin base layer and a cover layer.

After the thickness of the ultraviolet curable resin 20a is adjusted like this, ultraviolet rays are irradiated on the ultraviolet curable resin 20a. Thus, the ultraviolet curable resin 20a is cured (i.e., hardened) to be formed as the resin base layer 20. Further, the polymer membrane 40a functions as the cover layer 40. A composite body 56 composed of the resin base layer 20 and the cover layer 40 is thus obtained, as shown in FIG. 6. The resin base layer 20 has the protruding portions 24a to 24c which are formed by curing the resin filling the cavity 50, the recessed portions 22a, 22b between the protruding portions 24a to 24c, and the flat portion 26 which is formed by curing the resin overflown from the cavity 50 and pressured by the roller 54.

Figure 7:
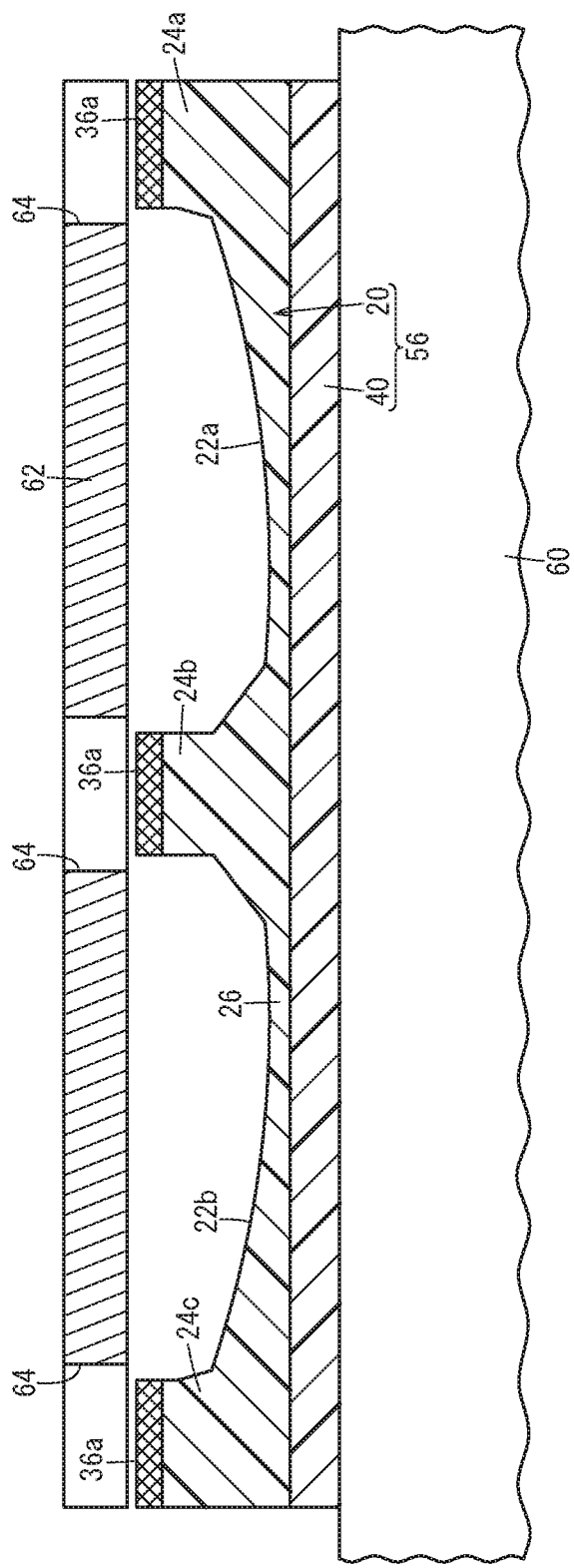
FIG. 7 is a schematic longitudinal sectional view showing a state that ink is printed on the composite body shown in FIG. 6 by a screen printing apparatus.

Then, the composite body 56 is set on a screen printing apparatus (printing apparatus). The screen printing apparatus is equipped with a pedestal portion 60 and a screen 62 shown in FIG. 7. The composite body 56 is held on the pedestal portion 60 with its flat portion 26 directed downward. Furthermore, ink 36a becoming the printed layer 36 is printed on the top surfaces of the protruding portions 24a to 24c.

Here, the screen 62 is formed with passage openings 64 through which the ink 36a passes. In the prior art, in the case where the ink 36a is printed on the top surfaces of the protruding portions 24a to 24c, the passage openings 64 are formed to dimensions agreeing with the areas of the top surfaces of the protruding portions 24a to 24c and are superposed on the top surfaces of the protruding portions 24a to 24c. In this case, the ink 36a may disadvantageously flow along the side surfaces of the recessed portions 22a, 22b and reach the bottom surfaces of the recessed portions 22a, 22b. The occurrence of the situation like this results in forming the printed layer 36 at each of the bottom surfaces.

On the contrary, in the present embodiment, the passage openings 64 are formed to be slightly wider than the top surfaces of the protruding portions 24a to 24c, so that inner edge portions of the passage openings 64 overlap the recessed portions 22a, 22b. That is, the inner edge portions of the passage openings 64 are set to be partly over the recessed portions 22a, 22b. The ink 36a is supplied in this state.

Figure 8:
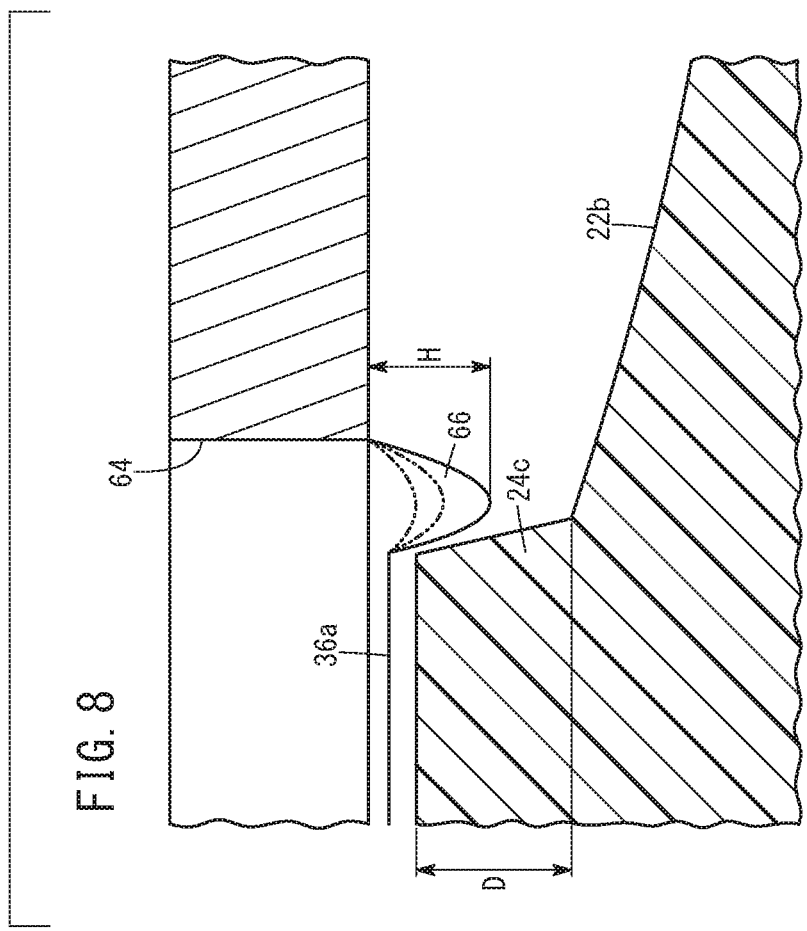
FIG. 8 is an enlarged sectional view of an important portion shown in FIG. 7.

At this time, the ink 36a at the inner edge portions of the passage openings 64 slightly droops toward the recessed portions 22a, 22b and remains in this state. As a result, there are formed ink droops 66 as typically shown in FIG. 8. The maximum droop height H of each of the ink droops 66 is set to be shorter than the depth D of the recessed portions 22a, 22b at positions facing the ink droops 66. Thus, the ink droops 66 can be prevented from adhering to the side surfaces and the bottom surfaces of the recessed portions 22a, 22b. Incidentally, as understood from FIG. 8, the depth D of the recessed portions 22a, 22b at positions facing the ink droops 66 is also the minimum depth of the recessed portions 22a, 22b. In other words, the maximum droop height H may be set to be smaller than the minimum depth of the recessed portions 22a, 22b.

It is possible to adjust the maximum droop height H of the ink droops 66 by properly adjusting the viscosity of the ink 36a or the number of printing operation times. That is, in the case where the viscosity of the ink 36a is large, one printing operation does not cause the ink droop 66 to grow so much. Therefore, it is possible to repeat the printing operations to a certain number of times, in other words, to increase the number of printing operation times to the certain number of times. Then, when the maximum droop height H of the ink droop 66 exceeds a tolerable range, the ink droop 66 should be wiped out.

Figure 9:
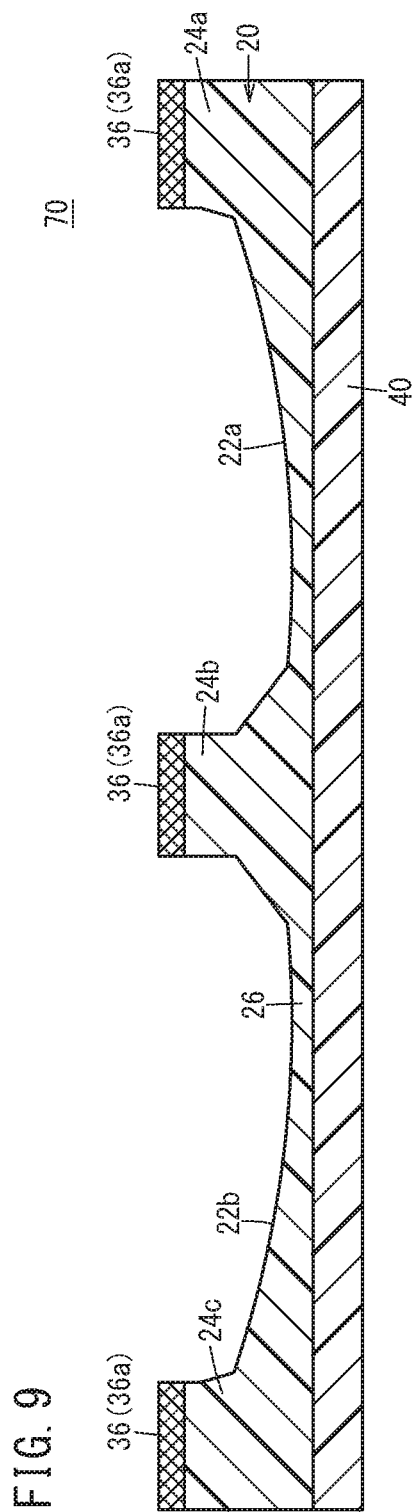
FIG. 9 is a schematic longitudinal sectional view of the composite body having the resin base layer and the cover layer and formed with a printed layer on the top surfaces of protruding portions constituting the resin base layer.

In this way, as shown in FIG. 9, the composite body 70 can be obtained in which the ink 36a is printed only on the top surfaces of the protruding portions 24a to 24c, in other words, the printed layer 36 is formed.

Figure 10:
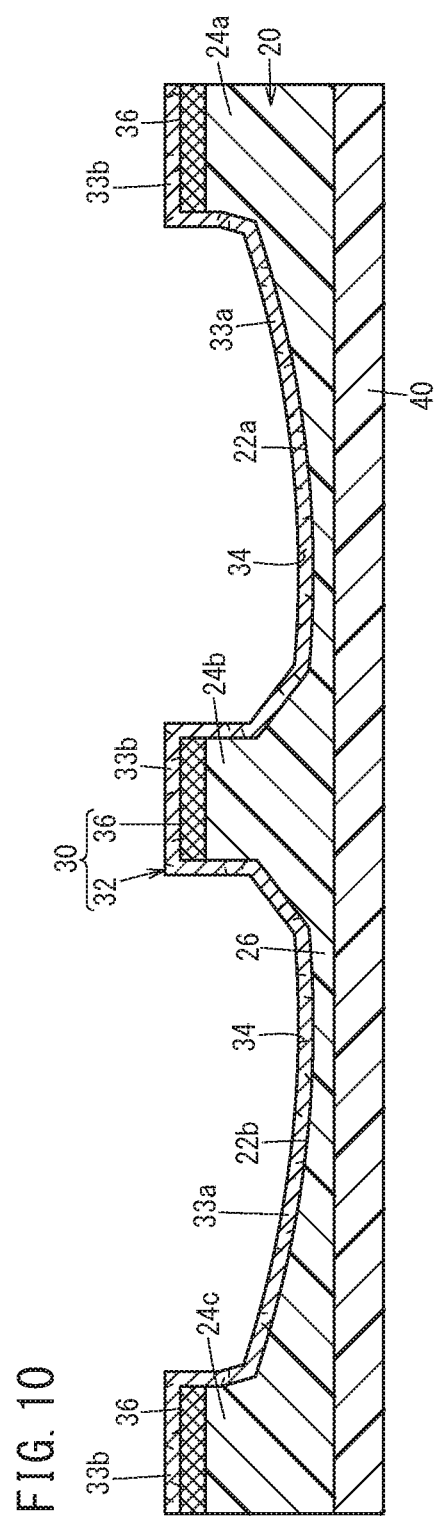
FIG. 10 is a schematic longitudinal sectional view showing a state that a metal layer is provided on the composite body shown in FIG. 9.

Subsequently, the metal layer 32 is formed as shown in FIG. 10. At this time, metal deposition can be done. Incidentally, it is preferable to choose indium, tin, alloys thereof or the like as the metal. This is because these are discontinuous metals and hence because it is possible in this case to easily obtain the metal layer 32 having the discontinuities 34 and showing radio wave transmissivity.

Figure 11:
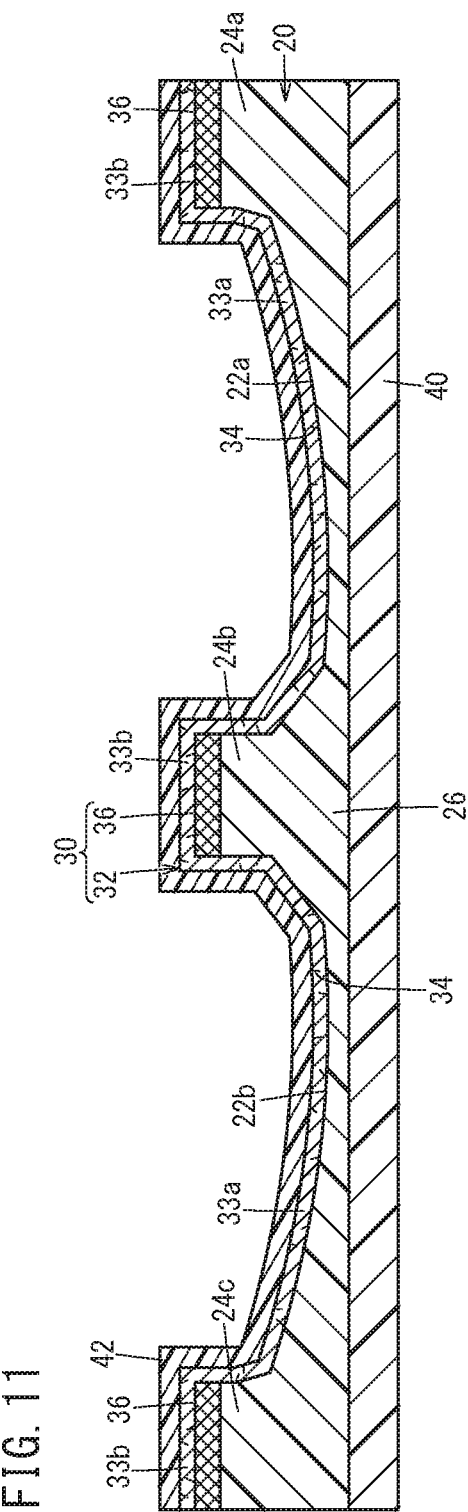
FIG. 11 is a schematic longitudinal sectional view showing a state that a support layer is further provided on the composite body shown in FIG. 10.

As need arises, the support layer 42 is formed on the metal layer 32 as shown in FIG. 11. It is possible to form the support layer 42 by, for example, spraying urethane resins, vinyl chloride resins or the like by a coating machine. Thus, the support layer 42 following the shape of the metal layer 32 is obtained, whereby the resin molded article 10 is obtained. Any portion not to be formed with the support layer 42 may be covered by masking.

Thereafter, the adhesive tape 44 is affixed to the plain portions of the support layer 42 (refer to FIG. 2). As a consequence, it becomes possible to affix the resin molded article 10 to the article 48 such as the casing of the smart key or the like through the adhesive tape 44.

As described above, according to the present embodiment, the printed layer 36 is formed only on the top surfaces of the protruding portions 24a to 24c but is refrained from being formed on the side surfaces and the bottom surfaces of the recessed portions 22a, 22b. Thus, the user is able to visually recognize only the metal layers 32 (correspondingly recessed portions 33a) provided at the recessed portions 22a, 22b. Therefore, it is possible to recognize the metal layer 32 as the ornamental portion 14 with gloss so as to be excellent in stereoscopic effect.

In addition, because the correspondingly recessed portions 33a can be visually recognized without any partial omission and because the correspondingly flat portions 33b are invisible, the ornamental portion 14 can be recognized as the ornamental character "H" having a desired shape and dimension. That is, it is possible to accurately obtain the ornamental portion 14 as one having the desired shape and dimension.

The same process as described above is repeated for a next resin molded article 10. The repetition of this process causes the ink droop 66 (refer to FIG. 8) to grow. When the maximum droop height H of the ink droop 66 exceeds the tolerable range, the wiping-out (removing) of the ink droop 66 is performed. It is possible to increase the number of printing operation times per unit time with an increase in the number of repetition times until the wiping-out becomes due.

The present invention is not particularly limited to the foregoing embodiment and may be variously altered without departing from the gist of the present invention.

For example, the support layer 42 may be formed as need arises, and can be dispensed with in dependence on the joining strength between the metal layer 32 and the resin base layer 20.

What is claimed is:

1. A resin molded article comprising:
   a resin base layer formed of an ultraviolet curable resin;
   a cover layer provided on one end side of the resin base layer and formed of a polymer membrane; and
   a decorative layer formed at least at a recessed portion of the resin base layer, wherein the recessed portion is dented from another end side of the resin base layer toward the cover layer side;
   wherein the decorative layer formed at the recessed portion is visible through the resin base layer and the cover layer, and
   the decorative layer having a shielding layer that is more flexible in comparison to the resin base layer and is larger in elongation percentage than the resin base layer,
   wherein the shielding layer is smaller in Shore D hardness than the resin base layer.

2. The resin molded article according to claim 1, wherein the decorative layer has a metal layer formed of metal, and wherein the shielding layer is formed at portions other than the recessed portion and interposed between the metal layer and the resin base layer.

3. The resin molded article according to claim 2, wherein the metal layer includes discontinuities.

* * * * *